United States Patent
Sampathkumar et al.

(10) Patent No.: US 10,657,069 B2
(45) Date of Patent: May 19, 2020

(54) FINE-GRAINED CACHE OPERATIONS ON DATA VOLUMES

(71) Applicant: Seagate Technology LLC, Cupertino, CA (US)

(72) Inventors: Kishore Sampathkumar, Bangalore (IN); Pradeep Balakrishnan, Sunnyvale, CA (US); Shashikiran Venkatesh, Karnataka (IN)

(73) Assignee: Seagate Technology LLC, Fremont, CA (US)

( * ) Notice: Subject to any disclaimer, the term of this patent is extended or adjusted under 35 U.S.C. 154(b) by 82 days.

(21) Appl. No.: 15/594,761

(22) Filed: May 15, 2017

(65) Prior Publication Data

US 2018/0329831 A1 Nov. 15, 2018

(51) Int. Cl.
| | |
|---|---|
| *G06F 12/123* | (2016.01) |
| *G06F 12/0891* | (2016.01) |
| *G06F 12/0897* | (2016.01) |
| *G06F 12/0811* | (2016.01) |
| *G06F 12/12* | (2016.01) |

(52) U.S. Cl.
CPC ........ *G06F 12/123* (2013.01); *G06F 12/0811* (2013.01); *G06F 12/0891* (2013.01); *G06F 12/0897* (2013.01); *G06F 12/12* (2013.01); *G06F 2212/1016* (2013.01); *G06F 2212/601* (2013.01)

(58) Field of Classification Search
CPC .......................... G06F 12/0891; G06F 12/123
USPC ......... 711/118, 133, 159, 113, E12.069, 134
See application file for complete search history.

(56) References Cited

U.S. PATENT DOCUMENTS

| | | |
|---|---|---|
| 5,664,150 A | 9/1997 | Isaac et al. |
| 5,751,655 A * | 5/1998 | Yamazaki ................ G11C 7/22 365/233.14 |
| 6,047,358 A | 4/2000 | Jacobs |
| 6,247,099 B1 | 6/2001 | Skazinski et al. |
| 7,310,712 B1 | 12/2007 | Gordon |
| 7,441,081 B2 | 10/2008 | Humlicek |
| 8,402,218 B2 | 3/2013 | Gray et al. |

(Continued)

OTHER PUBLICATIONS

Megiddo, Nimrod et al., "ARC: A Self-Tuning, Low Overhead Replacement Cache. Proc. of 2nd USENIX Conference on File and Storage Technologies," San Francisco, CA, pp. 115-130, Mar. 31-Apr. 2, 2003.

(Continued)

*Primary Examiner* — Tuan V Thai
*Assistant Examiner* — Edward Waddy, Jr.
(74) *Attorney, Agent, or Firm* — Kagan Binder, PLLC

(57) ABSTRACT

A method includes accessing a cache including a first cache block and setting the first cache block to a passive sub-state, where the first cache block in the passive sub-state is configured to be accessed or modified. The method also includes receiving at least one access or modification request of the first cache block and transitioning the first cache block from the passive sub-state to an active sub-state. The method also includes incrementing an ordinal cache activation count at an active cache counter in response to the transitioning, where the active cache counter is configured to track the activation counts such that oldest cache use counts are designated to be overwritten in the cache in an oldest-first fashion.

20 Claims, 7 Drawing Sheets

(56) References Cited

U.S. PATENT DOCUMENTS

| | | | |
|---|---|---|---|
| 8,706,950 B2 | 4/2014 | Yano et al. | |
| 8,719,501 B2 | 5/2014 | Flynn et al. | |
| 8,966,184 B2 | 2/2015 | Atkisson | |
| 9,146,808 B1 | 9/2015 | Butler et al. | |
| 9,251,086 B2 | 2/2016 | Peterson et al. | |
| 2004/0015731 A1* | 1/2004 | Chu | G06F 1/3225 |
| | | | 713/300 |
| 2004/0068622 A1* | 4/2004 | Van Doren | G06F 12/0808 |
| | | | 711/146 |
| 2011/0010502 A1* | 1/2011 | Wang | G06F 12/121 |
| | | | 711/128 |
| 2012/0215964 A1* | 8/2012 | Kaneko | G06F 12/0246 |
| | | | 711/103 |
| 2014/0122809 A1 | 5/2014 | Robertson et al. | |
| 2014/0177376 A1* | 6/2014 | Song | G11C 29/783 |
| | | | 365/230.03 |
| 2014/0244902 A1 | 8/2014 | Simionescu et al. | |
| 2016/0085691 A1* | 3/2016 | Benedict | G06F 12/0806 |
| | | | 711/136 |
| 2017/0262178 A1* | 9/2017 | Hashimoto | G06F 3/0604 |

OTHER PUBLICATIONS

Zhou, Yuanyuan et al., "The Multi-Queue Replacement Algorithm for Second Level Buffer Caches," Proc. of the 2001 USENIX Annual Technical Conference, Boston, MA, 15 pages, Jun. 25-30, 2001.

Moellenkamp, Joerg, "Some Insight into the read cache of ZFS—or: The ARC," C0T0D0S0.org, Feb. 20, 2009, accessed Nov. 28, 2016. 10 pages. http://www.c0t0d0s0.org/archives/5329-Some-insight-into-the-read-cache-of-ZFS-or-The-ARC.

* cited by examiner

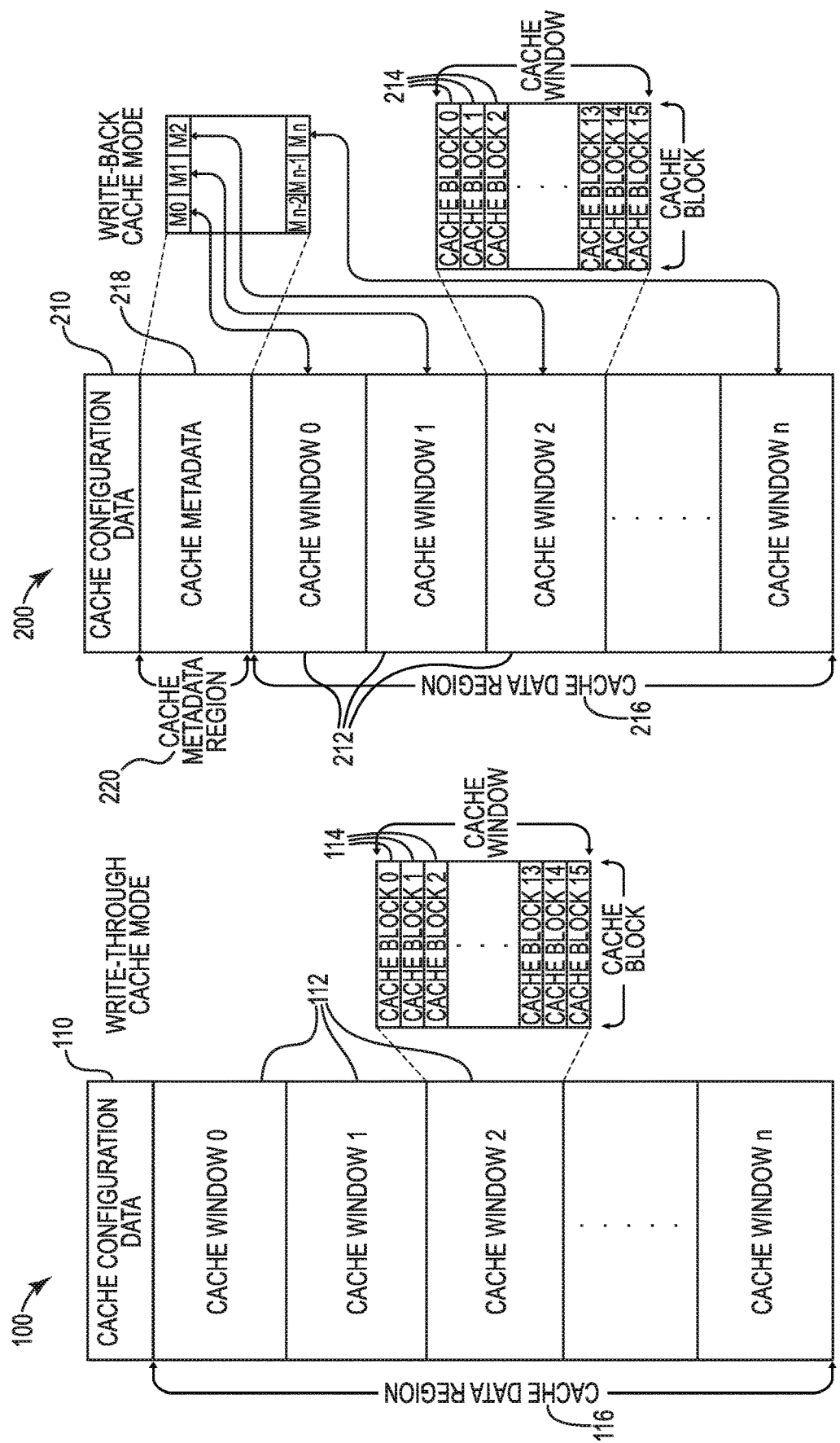

FINE-GRAINED CACHE OPERATIONS ON DATA VOLUMES

BACKGROUND

The present disclosure relates to aspects of electronic storage, and relates in particular to improvements to the management of cache operations on one or more solid-state, hard disk drive, or other storage devices.

Due to the nature of computing architecture, it can be beneficial to use a high-speed cache to temporarily store data that has been commonly or frequently accessed, was recently accessed, or is probabilistically likely to be accessed in the future. A cache can be part of a storage hierarchy, and can be a software or hardware component. For example, data to be stored, or "cached," can use high-speed flash devices like solid-state devices (SSDs), which may utilize flash memory, static random access memory (SRAM), and other types of storage devices, as applicable, or a portion of a hard-disk drive that has faster access speed that the rest of that drive. Hierarchical caching structures are beneficial to the operation of computers at least in part due to the concept of "locality of reference," which asserts that the locality of a reference (e.g., one or more data blocks), either spatial or temporal, is an important factor that can limit or otherwise determine a computer's maximum or expected performance. In some embodiments, it is worth noting that a cache may store a duplicate of a data block that is already stored on a primary, back-end storage medium, also termed a "backing store" or "source." By design, caches tend to be higher-speed than other associated storage devices (such as the backing store), but caches may have a trade-off of a more limited storage capacity, in some embodiments. The terms cache and cache devices are used interchangeably, herein.

SUMMARY

Embodiments of this invention introduce new caching states configurable with cache sub-states, along with an active cache counter (for keeping activation counts for individual virtual disks, such as caches or cache blocks) allowing fine-grained control of caching for data volumes. The activation count for each cache block generally provides a coarse granularity of history of activation instances by providing a time-stamp for the cache blocks involved. Using these tools, direct control is available to the user on deciding and setting caching parameters. Also provided is a new framework for the user or application to define policies for cache clean-up (e.g., cache invalidation), and cache meta-data management.

In one aspect of the present disclosure, a method includes accessing a cache including a first cache block. The method also includes setting the first cache block to a passive sub-state, where the first cache block in the passive sub-state is configured to be accessed or modified. The method also includes receiving at least one access or modification request of the first cache block. The method also includes transitioning the first cache block from the passive sub-state to an active sub-state. The method also includes incrementing an ordinal cache activation count at an active cache counter in response to the transitioning, where the active cache counter is configured to track the activation counts such that oldest cache use counts are designated to be overwritten in the cache in an oldest-first fashion.

In a second aspect of the present disclosure, a cache controller includes a processor operatively connected to a memory. The cache controller is configured to perform various steps. The cache controller is configured to perform a step of accessing a cache including a first cache block. The cache controller is also configured to perform a step of setting the first cache block to a passive sub-state, where the first cache block in the passive sub-state is configured to be accessed or modified. The cache controller is also configured to perform a step of receiving at least one access or modification request of the first cache block. The cache controller is also configured to perform a step of transitioning the first cache block from the passive sub-state to an active sub-state. The cache controller is also configured to perform a step of incrementing an ordinal cache activation count at an active cache counter in response to the transitioning, where the active cache counter is configured to track the activation counts such that oldest cache use counts are designated to be overwritten in the cache in an oldest-first fashion.

In a third aspect of the present disclosure, a computer program product for cache management includes a computer-readable storage device having a computer-readable program stored therein, where the computer-readable program, when executed on a computing device, causes the computing device to access a cache including a first cache block. The computer-readable program also causes the computing device to set the first cache block to a passive sub-state, where the first cache block in the passive sub-state is configured to be accessed or modified. The computer-readable program also causes the computing device to receive at least one access or modification request of the first cache block. The computer-readable program also causes the computing device to transition the first cache block from the passive sub-state to an active sub-state. The computer-readable program also causes the computing device to increment an ordinal cache activation count at an active cache counter in response to the transitioning, where the active cache counter is configured to track the activation counts such that oldest cache use counts are designated to be overwritten in the cache in an oldest-first fashion.

These and various other features and advantages will be apparent from a reading of the following detailed description.

BRIEF DESCRIPTION OF THE DRAWINGS

Other objects and advantages of the present invention will be apparent from the following detailed description of the invention taken in connection with the accompanying drawings.

FIG. 1 illustrates cache components used during a write-through cache mode, according to various embodiments.

FIG. 2 illustrates cache components used during a write-back cache mode, according to various embodiments.

DETAILED DESCRIPTION

Figure 3:
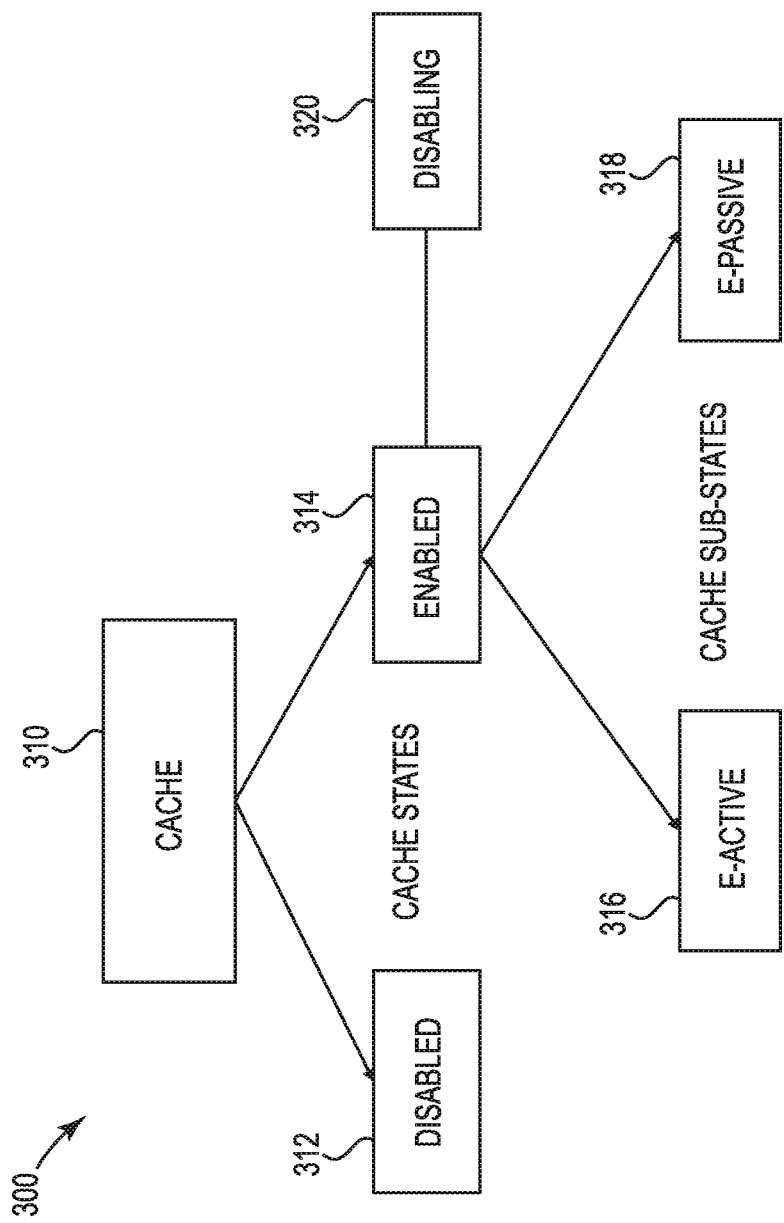
FIG. 3 is a cache state and sub-state hierarchy diagram, according to various embodiments.

FIG. 1 illustrates cache 100 components used during a write-through cache mode, according to various embodiments.

In order to perform cache operations, various cache aspects and structures can be utilized. As shown, an example cache 100 (e.g., a cache device) can be divided into cache windows 112, which are basic computer readable and writable units used in cache allocation and management. The limited usable storage space of cache data region 116 of a cache 100 is typically divided into a multiple of the cache windows 112, which are preferably equally-sized. Each cache window 112 preferably contains a device number for the mapped volume (which may also be termed a volume ID) and a window number for the mapped volume (i.e., a volume window number) corresponding to the data volume that is cached in this cache window 112. A data volume, as used herein, can be any medium in which data is stored (either physically or virtually) in a file or in a database, and each data volume may include metadata including the amount of related data to be stored. Various storage media contemplated include caches, cache windows, cache devices, and other media. Data volumes are also referred to as a virtual disks or virtual devices, and are indicated as VDs, herein. Corresponding to data stored in VDs, allocation and management of cache data is preferably done in units of cache windows 112. In some embodiments, it is contemplated that a single VD can include one cache device or can seamlessly span multiple cache devices.

Each cache window 112 may in turn be sub-divided into a preferably fixed number of equally-sized cache blocks 114 (also termed cache-lines). A cache block 114 is the basic unit of performing input/output (I/O) on a cache device 100. Within each cache window 112, data validity is typically tracked in terms of cache blocks 114. Both the cache window 112 size and cache block 114 size are configurable and thus can vary. In some embodiments, cache window 112 sizes can range from 64 kibibytes (KiB) to 1 mebibyte (MiB) (1024 KiB) and the corresponding sizes for cache blocks 114 may range from 4 KiB to 64 KiB, with 16 cache blocks 114 per cache window 112.

Caches can employ various modes of writing data to be cached to an associated backing data store. These modes are known as "write policies" or "cache modes." Cache modes include write-through (WT) and write-back (WB). Using a WT cache mode includes writing to both the cache and the backing store synchronously, i.e., at substantially the same time. In contrast, a WB cache mode involves an initial write to the cache 100 only. Metadata corresponding to the initial cache 100 write can then be marked as "dirty," if the metadata is not already marked as dirty (further described, below). The corresponding write to the backing store (not shown) occurs later, if at all. These cache modes are described in greater detail, below. As a result of synchronized writes in WT, cache data is typically non-persistent. For example, upon a possible system crash, the cache 100 would become invalid, but no recovery would be needed as the cached data should already have been written to the backing store. Similarly, upon system reboot the cache 100 used for WT would become invalid. Note that these polices can be limited to writing only, and may not apply to reading data. WT policy may be well-suited to a cache configured to be primarily read, and a WB policy may be well-suited to a cache configured for reading and/or writing.

FIG. 2 illustrates cache 200 components used during a write-back cache mode, according to various embodiments.

Shown is an embodiment of a cache 200 configured to utilize a write-back (WB) writing policy. When compared to WT, WB is generally more flexible and configurable, but also typically more complex than WT. The relative complexities of WB and WT can be seen by comparing FIG. 2 to FIG. 1. Cache 200 has many of the same features as WT-configured cache 100 (FIG. 1), including cache configuration data 210, cache windows 212, cache blocks 214 within each cache window 212, and a cache data region 216. But cache 200 also introduces additional features, including cache metadata 218, discussed further, below, which is preferably located or stored in an allocated cache metadata region 220 of cache 200.

Cache metadata 218 (also simply referred to as metadata) is shown in some detail, and may include information ($M_0$, $M_1$, $M_2$, etc.) relating to each cache window 212 (shown as $M_{n-2}$, $M_{n-1}$, $M_n$, etc.) corresponding to each cache window 0 through n 212, respectively. Note that cache metadata 218 along with cache blocks 214 and cache windows 212 may take up a greater percentage of cache 200 per total cache block 214 than in WT-configured cache 100 because cache metadata region 220 may not be necessary in WT-configured cache 100. Although cache metadata region is depicted as comparable in size for each cache window 212, various relative sizes of cache metadata region 220 and cache windows 212 are contemplated, and the various features may not be necessarily drawn to scale.

As a difference from the WT writing policy, WB utilizes temporally, and situation-flexible asynchronous cache writes. In contrast to the synchronous cache writes in WT, asynchronous cache writes involve an immediate write operation to the cache 200, but a delayed (or sometimes non-existent) write operation to the backing store. In WB, the cache writes can also be triggered by various events or circumstances, such as an indication that a particular cache block 214 is about to be modified or overwritten with new content, or otherwise is directed to update the cache 200.

Also in contrast to WT policies, persistent metadata 218 in WB can be maintained in the allocated cache metadata region 220 of cache 200. For example, upon a system crash or temporary shut-down, the cache blocks 214 potentially affected by the crash may still technically be valid, but would become "dirty" as well as valid. A dirty cache block 214 can be tagged using metadata 218 and corresponding backing store blocks can be targeted and set to be overwritten, but the data on the corresponding backing store is not yet actually overwritten. With a WB policy, upon a system reboot, the cache blocks 214 are typically both valid and clean. A clean cache block 214, in contrast to a dirty cache block 214, is one that has corresponding backing store blocks not yet been overwritten (and has clean cache blocks 214 so marked through metadata 218), and which therefore can contain usable data that can be read. In contrast to dirty cache blocks 214, so-called "invalid" cache blocks 214 contain old, obsolete data that eventually will be refreshed and updated from the associated backing store.

A selected cache policy (e.g., WT or WB) may not apply separately at the granularity of cache windows 212, much less at the granularity of cache blocks 214. In various embodiments, a cache policy applies to an entire cache 200 or VD as a whole.

A shortcoming of many types of caches (e.g., cache 100 or 200) includes a limited useful lifespan, sometimes based on a number of read/write cycles. For every time the cache 200 sub-system is restarted, or the host system on which this runs is rebooted and/or power cycled, the cache 200 is typically rebuilt in WT cache mode. This is because the cache 200 is non-persistent when in WT cache mode. Every time the system associated with the cache 200 is restarted, or the host system is rebooted or power cycled, the system generally starts from an initialization step. In WB cache mode, there is typically no need for the initialization step since the cache is persistent, leading to a reduction in overall cache read/write cycles, and therefore extending cache 200 usable lifespan.

FIG. 3 is a cache state and sub-state hierarchy diagram 300, according to various embodiments.

Figure 8:
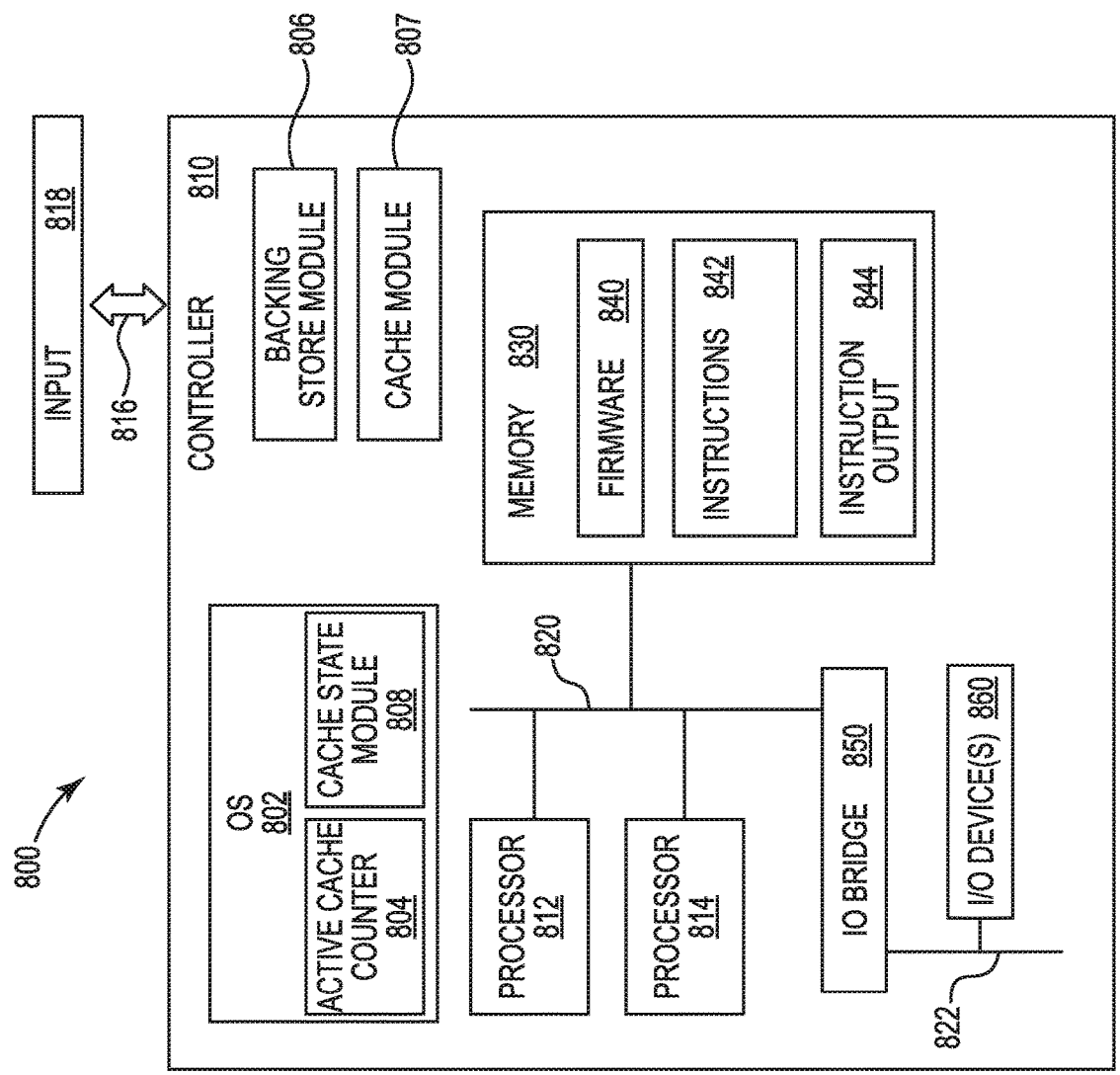
FIG. 8 is a computer system according to embodiments of the present disclosure.

As discussed herein, a cache 310 can implement data caching within one or more cache blocks (not shown, see e.g., cache blocks 214 of cache 200, FIG. 2) either in software on host operating systems or on firmware in a controller (see FIG. 8). Though often advantageous to system performance, caching functionality within each of one or more cache blocks can be turned on (enabled) 314, turned off (disabled) 312, or cache 310 may be in the process of changing from an enabled 314 state to a disabled 312 state, according to various situations. This third possible cache state is termed "disabling," 320. For the purposes of this Figure, cache 310 represents one or more cache blocks within a cache. If caching is disabled, a computer component or system may function as if there were no cache 310 present at all. In other words, for a cache 310 (e.g., a cache VD or cache window) in the disabled state 312, all I/O operations issued on the given storage system (which may include cache 310) may simply bypass caching, and the I/O operations would be issued directly to an associated backing store (e.g., primary data storage, not shown) disks. A disabled cache state 312 preferably allows direct access to VDs of the backing store, even though they may be configured into the SSD-based caching system.

In contrast to the disabled cache state, a cache 310 can also be configured to be in an enabled state 314. In an enabled state 314, the (e.g., SSD-based) caching functionality takes effect, which, is the focus of aspects of this disclosure. If caching is enabled 314, various caching functions can be configured to be used to determine and control what data is to be cached in the cache 310, as well as other caching parameters including how, where, and when. At present, however, users and applications are often tasked with directly controlling the myriad decisions regarding caching parameters. Known, but simplistic caching parameters include the least-recently used (LRU) model, the most-frequently used (MFU) model, among others, and various variations and combinations thereof. There is a desire, however to automatically use limited cache space as efficiently as possible using disclosed frameworks that automatically define policies for cache usage, management, and clean-up.

As mentioned above, the third cache state is termed a "disabling" state 320. For a cache in a disabling state, any dirty data in the cache is still in the process of being flushed (i.e., changing from enabled to disabled), and as a result the cache may be at least partially indisposed. Note that the term "disabling" indicates that the process in underway, yet incomplete, which will eventually lead to a disabled state. For a cache state of disabling 320, any I/O operation to be issued on a cache block may bypass caching and be issued directly to the backing store disks, similar to a cache in the disabled 312 state. But, in some embodiments, this cache bypass may apply only if an applicable range of cache blocks being addressed, possibly within a cache window (e.g., a logical block address [LBA] range) has not already been cached. If there is cached data corresponding to any cache blocks in the range of cache blocks on which an I/O operation is issued, it may in some cases be more practical to not bypass the cache. Bypassing the cache in the above situation may result in data inconsistency between the cache and the associated backing store disks. In the case of data inconsistency, the I/O operation would be issued as a cached I/O operation instead.

In addition to the enabled 314, disabled 312, and disabling 320 cache states, two sub-states are also introduced for cache blocks that are in the enabled state 314. The two sub-states now introduced include the enabled-passive 318 (e-passive) and enabled-active 316 (e-active) sub-states. Note that there are neither disabled-active nor disabled-passive cache sub-states considered, as they would be irrelevant to management of a disabled cache 310. For similar reasons, no sub-states are considered for the disabling cache state 320.

In the e-passive 318 sub-state, if it is determined that there already exists valid cache blocks for a cache 310, then as applicable, those cache blocks are read from and/or written to. Any read or write operation not having corresponding valid cache blocks would simply bypass those cache blocks and directly access or update the corresponding data on the respective backing store disks, according to various embodiments. Note that when a cache block is in disabling state, it may be handled the same way as that of handling I/O operations in e-passive sub-state on an enabled cache block.

On the other hand, in the e-active 316 sub-state, every access (i.e., read request) or update (i.e., write request) should, by its nature, result in valid cache blocks. Already-existing cache blocks involved are also read from or written to, as applicable. Every read or write request issued on a cache that results in cache misses (i.e., an attempt to access data on a cache where the data is not found or present) of one or more cache blocks (e.g., cache blocks 114, 214) results in allocating the missing cache blocks, if the cache blocks are not already allocated, and filling them with relevant data to be cached.

Figure 4:
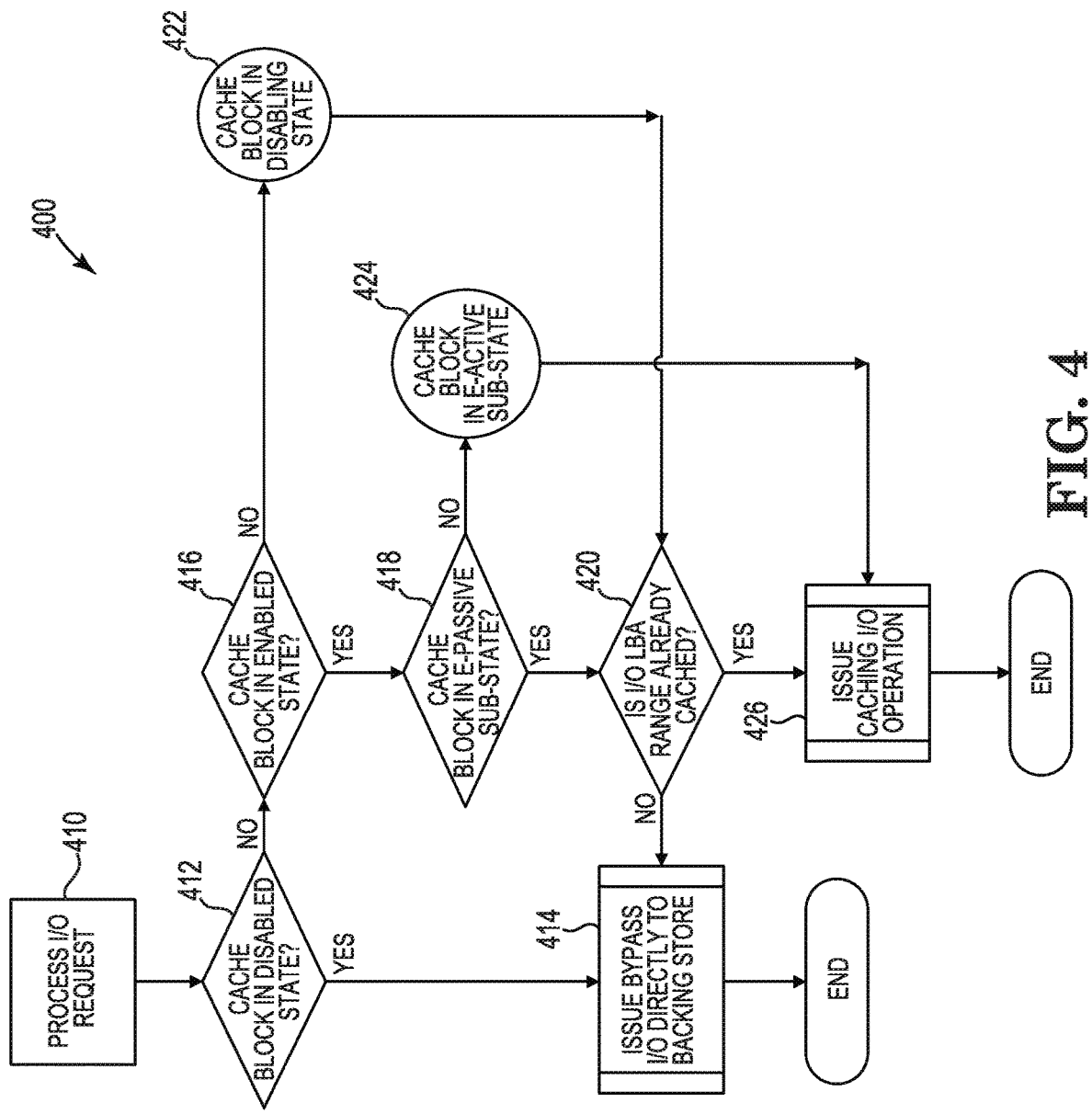
FIG. 4 is a flowchart illustrating operations for processing an input/output request, according to various embodiments.

FIG. 4 is a flowchart 400 illustrating operations for processing an input/output request, according to various embodiments.

According to various embodiments, to process a received I/O request at operation 410 in a computer system (e.g., the system 800 shown in FIG. 8, below), it may first be determined whether a first cache block is in a disabled state at operation 412. For the purposes of embodiments relating to FIG. 4, the term "cache block" can also denote an entire "cache," being composed of multiple cache blocks. As such, a cache having cache blocks in various states can denote that a cache itself has the state of the cache blocks, within.

If it is determined that the first cache block is in a disabled state at operation 412, the I/O request can be issued directly to an applicable backing store in the computer system at operation 414. The processing steps involved in "issue bypass I/O" operation 414 are also preferably defined as one or more pre-defined processes. An issue bypass I/O operation 414 command may directly issue the I/O operation to the associated backing store disk(s).

If, however it is determined that the first cache block is not in a disabled state at operation 412, it may be determined if the first cache block is in an enabled state at operation 416. As explained above, a third cache state possibility also exists, as outlined in FIG. 3, namely the "disabling" state. If it is determined at operation 416 that the first cache block is also not in an enabled state, then it can be concluded that the first cache block is in a disabling (i.e., neither fully enabled nor fully disabled) state at operation 422, and the process may continue to operation 420, where it may be determined by the computer system whether an I/O LBA range has already been cached.

If at operation 416 it is determined that the first cache block is in an enabled state, it may then be determined whether the first cache block is in an e-passive sub-state at operation 418. If it is determined that the first cache block is not in an e-passive sub-state at operation 418, then the first cache block may be determined to be in an e-active sub-state at operation 424, upon which a caching I/O operation would be issued to the first cache block at 426. If at operation 418 it is determined that the first cache block is in an e-passive sub-state, then it may next be determined at operation 420 whether the I/O LBA range is already cached. As before, if at operation 420 it is determined that an I/O LBA range has not already been cached, then a bypass I/O operation may be issued directly to the associated backing store of the first cache block at operation 414 and the process may end. If, however, at operation 420 it is determined that the I/O LBA range has indeed already been cached, a caching I/O operation may be issued to the first cache block at operation 426 and the process may end.

The processing steps involved in "issue caching I/O" operation 426 are preferably defined as one or more predefined processes. In short, in operation 426, a particular request may be handled one way in WT cache mode, and handled another way in WB cache mode, as known.

Figure 5:
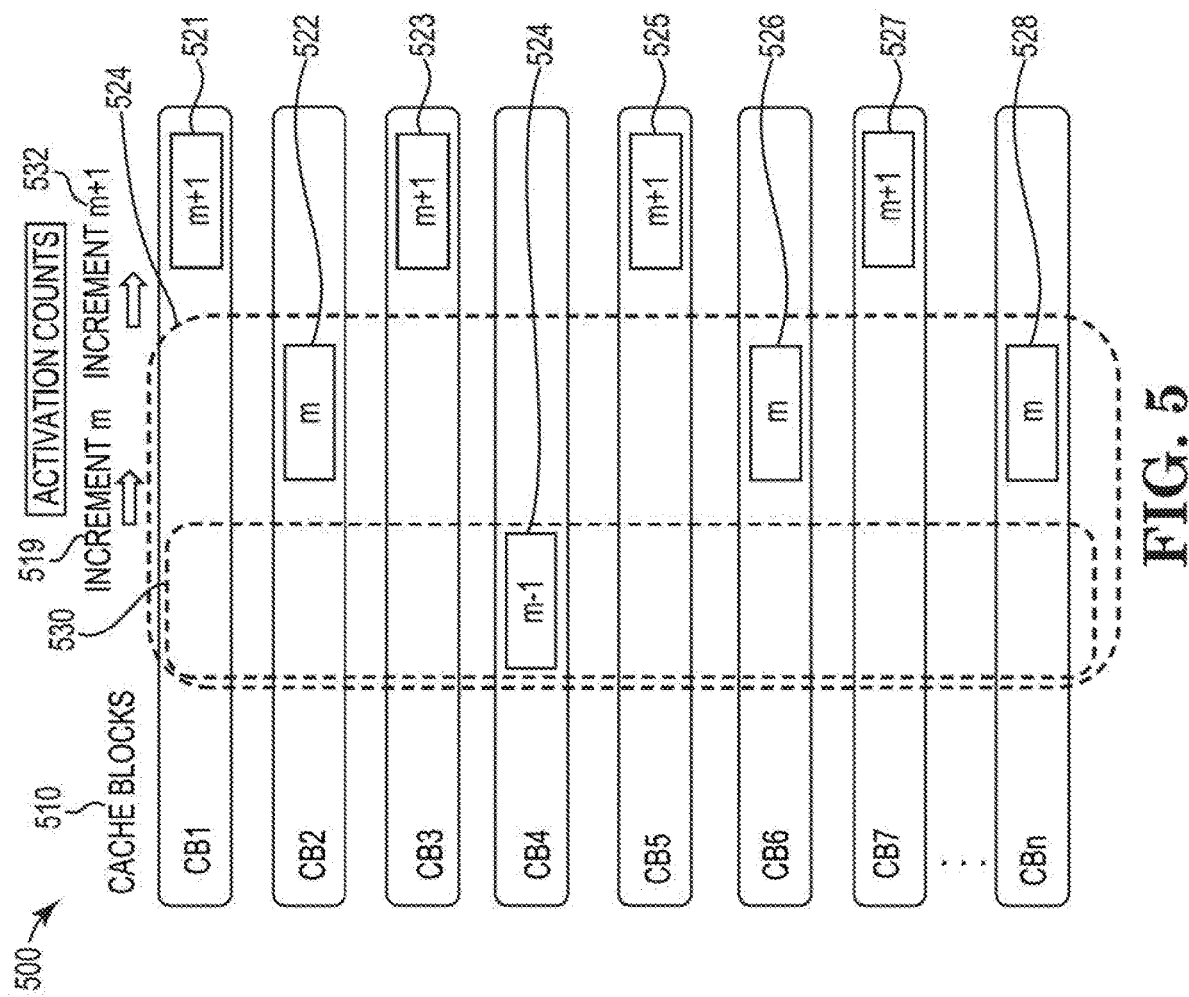
FIG. 5 is an illustration of a cache, including plurality of cache blocks, associated activation counts, and how cache blocks may be selected for being invalidated, according to various embodiments.

FIG. 5 is an illustration of a cache 500, including plurality of cache blocks 510, associated activation counts, and how cache blocks 510 may be selected for being invalidated, according to various embodiments.

As shown, a cache 500 (e.g., a VD) may contain "n" cache blocks 510 (e.g., CB1-CBn), each with an individual, incrementable, activation count (in some embodiments an ordinal count like m−1, m, m+1, etc.). Activation counts 521-528 can be introduced for each individual, respective cache block 510. An activation count can instead be introduced with respect to an entire VD, such as cache 500, according to various embodiments. In such a case when an entire cache 500 has a single activation count, cache block 510 activation counts can be derived from the activation count of the corresponding cache 500 or VD.

When a cache block 510 transitions to an e-active sub-state, the activation count of the cache block 510 (or cache 500) can also be correspondingly incremented, according to various embodiments. For example, in the e-active sub-state, each read/write request results in updating the current activation count of each of the cache blocks involved to that of the current activation count of the corresponding VD (or cache block 510). However, in the e-passive sub-state, for each read or write request, the current activation count of the cache blocks 510 involved is unchanged. As a result, the activation count for a cache block 510 provides a coarse granularity of history of activation instances by providing a time-stamp for the cache blocks 510 involved. An activation count of "m" (which, in this case describes CB2, CB6, and CBn) indicates that the last time the data on the given cache block 510 was accessed and/or modified was during the "$m^{th}$" activation instance of the cache.

The cache block 510 activation counts, in combination with the corresponding cache sub-states, may be used to provide a useful mechanism for fine-grained cache control, of which further examples are outlined herein. In other words, the tracking of activation counts and selected active cache counter values may provide a framework for determining whether cache data is old and when to delete it. As an example, when the cache blocks 510 transition from e-active sub-state (say, with activation count "m+1") to e-passive sub-state (activation count remaining at "m+1"), all cache blocks with activation count "m" or less can be deleted at 532 (e.g., made dirty, and have backing store block(s) able to be safely overwritten) since they correspond to old entries that are no longer needed. In another embodiment, only the even older, less-recently used cache blocks with activation count m−1 can be selected and deleted at 530. This can be extended to define policies on how much of old data has to be retained, depending on preferences and/or circumstances.

Depicted are two activation count increments. First, shown at 519 is an increment from activation count m−1 to m. Second, shown at 520 is an increment from activation count m to m+1. As one example, cache block CB4 is neither incremented to m at 519, nor incremented to m+1 at 520, and is therefore a prime candidate for deletion. On the other hand, cache blocks CB1, CB3, CB5, and CB7, as shown, have each had their respective activation counts incremented to m+1, and are therefore poor candidates for deletion after the second increment 520 to the cache 500. As described herein, the activation counts of the cache blocks 510 are not incremented on transition to e-passive sub-state. For example the ground of cache blocks with increment m−1 shown at 530, including CB4 may have transitioned at increment 520 from e-passive to e-passive, which would not result in incrementing CB4 to m+1. Switching the caching state of the VD and/or cache 500 from enabled to disabled in-turn can involve a cache invalidation operation on the individual cached blocks 510 corresponding to the VD and/or cache 500 being disabled.

Cache invalidation is generally a process whereby entries (data stored in cache blocks 510) in a cache are replaced or removed. Cache invalidation can be included in a cache coherence protocol, for example. This cache invalidation operation can be triggered in the background (e.g., as a daemon). As discussed, in the WT cache mode, cache block 510 entries can be invalidated directly. And, in the WB cache mode, before invalidating the cache there is typically a prior step of flushing dirty data to the backing store disk(s). As discussed, while the invalidation is in progress, the caching state of a cache block 510 is set to an intermediate "disabling" state.

Intuitively, an invalidation of the entire cache 500 generally takes an amount of time that dependent upon the amount of cached data set to be invalidated. This can take significantly more time in WB cache mode as compared to WT cache mode for at least the reasons outlined above. In WB cache mode, any dirty data in the cache 500 may need to be flushed to the backing store disk(s) before invalidating the cache 500 in order to preserve cache-backing store data continuity. Once cache invalidation is completed, the cache state for each individual cache block 510 can then be set to "disabled."

Figure 6:
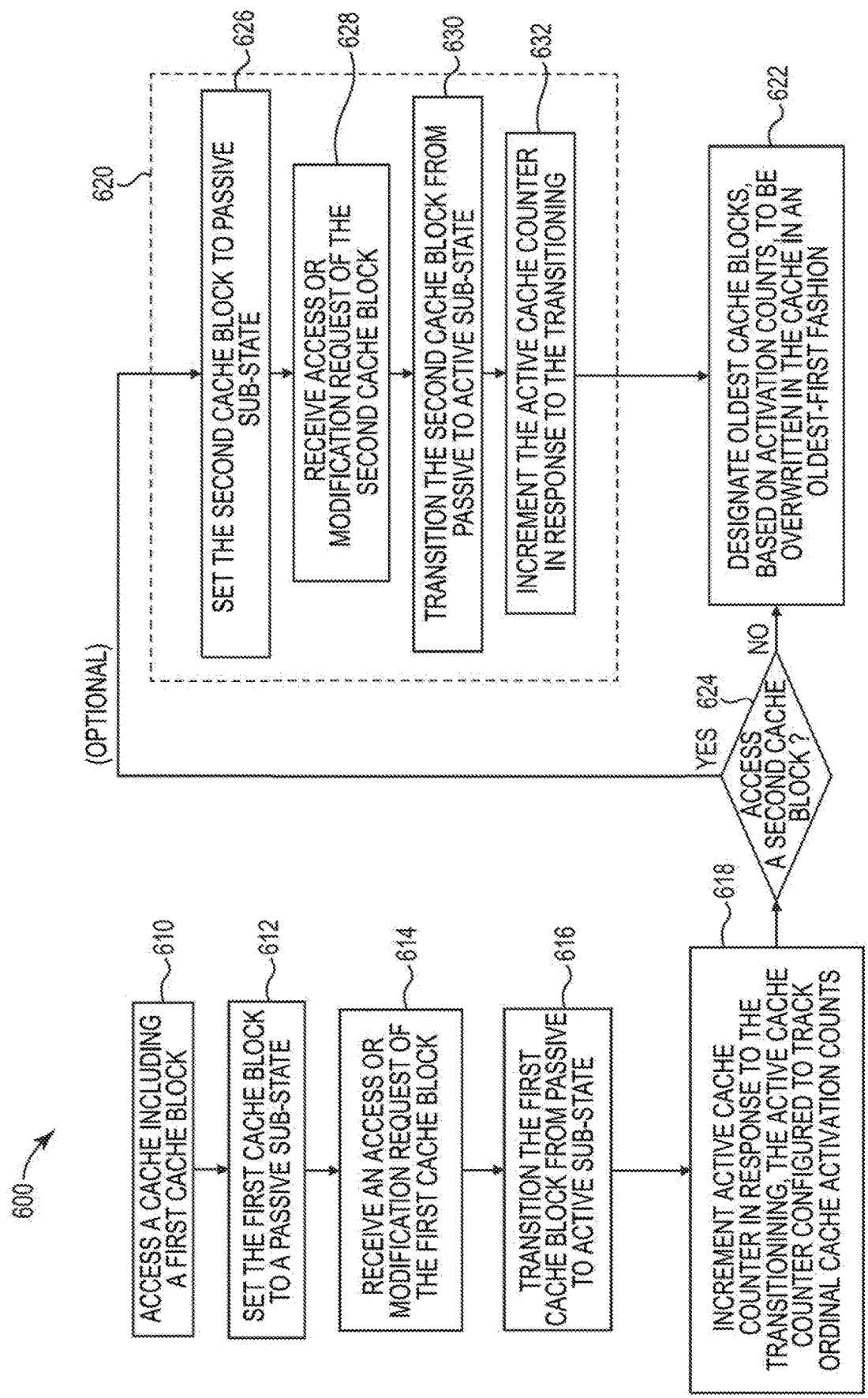
FIG. 6 is a flowchart of a process for determining an order in which cache blocks are to be overwritten in a cache, according to various embodiments.

FIG. 6 is a flowchart of a process 600 for determining an order in which cache blocks are to be overwritten in a cache, according to various embodiments.

At operation 610, process 600 may begin by accessing a cache including a first cache block. At operation 612, the first cache block can then be set to an active sub-state, as described herein. At operation 614, an access or modification request of the first cache block can be received. At operation 616, the first cache block can then be transitioned from a passive sub-state to an active sub-state.

Upon transitioning the sub-state to active at operation 616, at operation 618 an activation count at an active cache counter can be incremented in response to the transitioning, where the active cache counter can be configured to track ordinal (i.e., ordered) cache active use counts (activation counts). Optionally, it may be determined if a second cache block is desired to be accessed at operation 624. If a second cache block is not desired to be accessed at operation 624, process 600 may then designate oldest cache blocks based on activation counts to be overwritten in the cache in an oldest-first fashion at operation 622.

According to other embodiments, following operation 618, but prior to operation 622, if it is determined that a second cache block is desired to be accessed at operation 624, optional steps 620 can be carried out. It may be desired to access a second cache block for various reasons, including operating a cache that includes more than one cache block, and which may in fact include a multitude of cache blocks, according to various embodiments. However, the operations described herein may also be applied to a single cache block, according to embodiments. During optional steps 620, operation 626 can include setting the second cache block to an active sub-state. At operation 628, an access or modification request may be received of the second cache block. At operation 630, the second cache block can transition from an active sub-state to a passive sub-state. The optional steps 620 may also include operation 632, where the activation count at the active cache counter is incremented in response to the transitioning at operation 630. Process 600 may then designative oldest cache blocks based on activation counts to be overwritten in the cache in an oldest-first fashion at operation 622.

An important aspect of embodiments herein includes improvements in efficiency compared to some previous cache management schemes, which have often treated all accesses of cache blocks equally, regardless of the purpose, function, or details of the accesses. It is notable that an operation that attempts to change a cache block from a given sub-state to the same sub-state is not counted as a transition according to various embodiments. For example, moving from a previous sub-state of e-active to a current sub-state of e-active would not be counted as a transition. Such non-transitions are considered NOOPS (NO OPerationS), and are treated accordingly for the purposes of activation counts and cache management, herein. The above may facilitate efficient management of caches and cache blocks, and reduce over-inclusive or under-inclusive cache block management operations.

Figure 7:
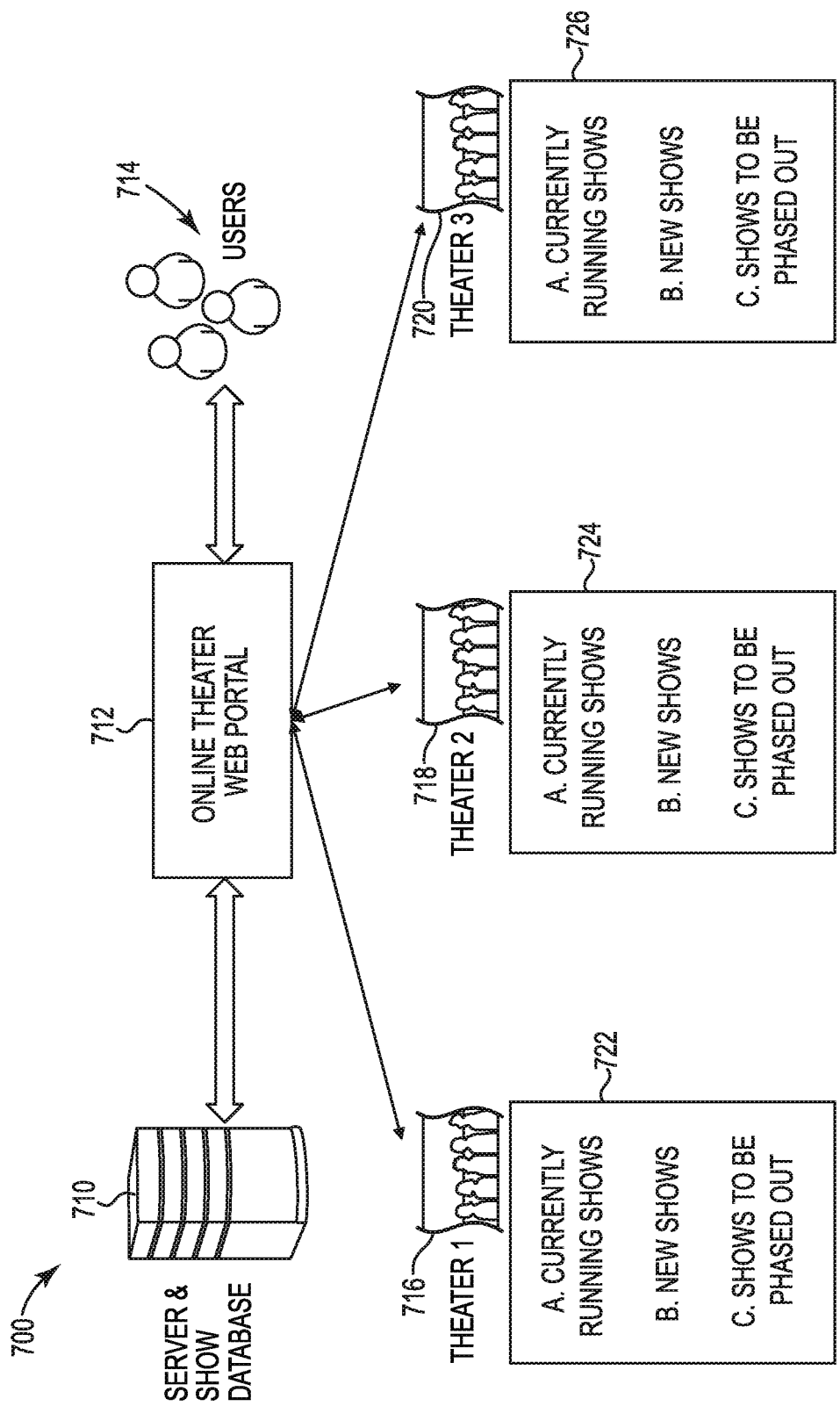
FIG. 7 is an example diagram of the present invention illustratively applied to a movie theater company that manages operations at multiple theaters, according to various embodiments.

FIG. 7 is an example diagram 700 of the present invention illustratively applied to a movie theater company that manages operations at multiple theaters, according to various embodiments. The management of various movie theater aspects can be representative of an analogy to the present invention as applied to cache devices.

For the purposes of the following embodiment, various simplifying assumptions are made. For instance, it is assumed that the entire filesystem resides on a single VD (e.g., including one or more caches), and there is a single cache device controller or system used to control caching on multiple caches. However, these examples preferably work equally well with a single cache that uses multiple individual VDs with a single filesystem configured on each FD. In other examples, multiple cache devices can be used to cache one or more VDs. A 1:1 relationship can exist between filesystems in a VD. A VD itself may be created to span across multiple physical drives (e.g., cache devices). Different VDs, each having its own filesystem, can be cached in the same "cache" VD, which can include one or more cache devices. In one example, a single VD includes multiple cache devices. In this case, there will exist multiple cache windows and cache blocks on the single VD acting as a cache. Each cache window of the entire VD can identified by a unique tuple including the cache device ID and the cache window number, and can act like a single cache device, according to various embodiments.

Consider an example theater company that provides an online portal 712 used to manage the information about films screened and entertainment shows conducted throughout the country at various theaters, collectively referred henceforth as "shows." Depicted are three theaters of the theater company, including theater one 716, theater two 718, and theater three 720, Each theater includes configurable show data including data relating to (A) currently running shows, (B) new shows, and (C) shows to be phased out. Theater 1 has show data 722, theater 2 has show data 724, and theater 3 has show data 726, as shown. Patrons (i.e., users) 714 may look up details of the currently-running shows via the Internet (e.g., through the online theater web portal 712), and the patrons 714 may conduct research and selectively make bookings, accordingly.

As mentioned, the show data 722, 724, and 726 includes data for new shows, which may be released regularly. Likewise, the show data may include data regarding old shows that are phased out over time, depending on whether there is continuing demand. Currently-running shows and schedules may be changed, based on demand. Based on demand in terms of current bookings, showings of a show may be stopped. These changes may be triggered from various locations (e.g., one of the theaters) at various times.

According to various embodiments, the show company may maintain a database of current shows in various venues located in cities throughout the country on a server 710. The server and show database 710 may also include all the relevant details, such as showtimes, runtime, location, ratings, current bookings already made, etc. The details for each show may be stored as a small file, e.g., 32 KiB. Correspondingly, there may be millions of such files, preferably stored in a filesystem such as Linux ext4 or XFS.

The server and show database 710 (corresponding roughly to a cache, as described herein) may be manually updated by administrators from various locations and at various times (e.g., refreshed on a daily or hourly basis), including adding, modifying, and/or deleting the shows. Adding new shows may include creating new files entirely. Update operations to the server and show database 710 may also include changes to currently-running shows, including updating the corresponding existing files (e.g., cache blocks, cache windows). Finally, update operations may also include deleting shows that will no longer be running, including deleting the corresponding existing files.

Preferably during a historically or typically low activity time of day (e.g., 2:00-4:00 a.m.), a read request (or re-read as applicable) may be issued on all the shows (cache entries) on the server and show database 710 (cache) corresponding to the shows currently running, in order to fill or replenish the database portion of the server and show database 710.

According to various embodiments, the usage model could initially enable the caching state of the server and show database 710 and set the sub-state of each show file to e-active, as described herein. A read may be issued on all the files corresponding to the shows, resulting in populating the database (cache) with the information for all the currently running shows. For example, after setting a show's sub-state to e-active, the activation count on the particular show (and associated information, such as location) is "m." Each of the shows (e.g., cache blocks) corresponding to the read contents are stamped with an activation count of "m."

Following initialization, the process may enter into a steady-state, and the sub-state may be set to e-passive. The information for all the currently running shows will already be located in the database (e.g., an SSD cache or VD). Next, end users may access the information about existing shows playing, at various intervals and times. This may result in doing reads on the cached show data. The sub-state would still remain at e-passive since it is only the cached data that is read from, and there are no new cache blocks that need to be filled. The activation count remains at "m'" on each of the cache blocks on which reads are issued.

According to circumstances, the server and show database 710 may be updated by the administrators from various locations at various times. For the updates, if the show data is already cached, this may result in doing writes on the cached (show data) blocks. In WT cache mode, this may additionally result in doing corresponding writes to the backing store, e.g., one or more hard-disk drives (HDDs), which may be located at the server and show database 710. If the data is not already cached, the writes bypass cache and are issued directly to the backing store. Corresponding to these, any end user 714 access (e.g., read requests) may be served directly from the backing store on the server and show database 710. The sub-state still remains at e-passive. The activation count then remains at "m" on each of the existing files (e.g., cache blocks).

Preferably during a low activity time of day, the sub-state is set to e-active. Following this, a re-read of all the files is executed, a replenishing action further outlined, herein. A cache can be reset to e-active at a set time of low activity in part because it would be a significant challenge to update show data when the cache is set to e-passive. Either the show data is in the cache or the show data is not in the cache, but in either case the show database 710 would need to be updated accordingly. While the re-read is in progress, administrators may also, in parallel, execute database updates from various locations. As mentioned, to refresh and replenish the database (cache), a re-read of all the show data files (each file may be a cache block corresponding to a currently running show) can be issued. For shows that continue to be played, the data should already exist in the database (cache) and hence no re-read is performed with respect to the corresponding files. For new shows, the database (cache) is preferably filled with the data corresponding to these files. In WT cache mode, this may also preferably result in doing corresponding writes to the backing store (not shown) at server and show database 710. All phased out shows would preferably have their corresponding files (e.g., cache blocks) marked for deletion (i.e., invalid cache blocks), hence no read would be issued on them in the future.

Of note, for previously retired or phased out (deleted) shows, invalid data may still continue to exist in the database (cache) with respect to the phased out shows. However, the deleted shows files will typically not be accessible, since there would be no way of accessing the shows (i.e., to the corresponding files) through the relevant filesystem of the server and show database 710, as there would be no file entries (metadata) corresponding to each deleted show. Existing filesystems typically implement deletion of files by removing the corresponding directory entries, and marking the allocated data blocks as free in the filesystem metadata tracking structures.

According to some embodiments, administrators can concurrently update the show database 710 on the server while updates are still taking place, including re-reads of the show files to replenish the database (cache). Since the example sub-state is e-active, both read and write operations issued would result in valid cache blocks. In WT cache mode, for write operations, this will also preferably result in doing corresponding writes to the backing store (not shown) on server and show database 710.

According to one embodiment, when a show file (cache block) sub-state is newly set to e-active, above, the activation count on the show file is incremented by one to "m+1." Only the show files that were accessed or modified in the e-active sub-state are also stamped with the numerically highest and most recent activation count of "m+1."

Next, the show file (cache block) sub-state is set to e-passive. At this time, all the show files that were not accessed during the previous activation continue to remain at activation count m, or less. In other words, the remainder of the show files then would keep their respective previous activation counts of m (one increment lower than m+1), m−1, m−2, etc. These show files primarily can correspond to files of deleted (e.g., invalid) or otherwise irrelevant shows. In one embodiment, any and all show files with activation count "m" or less are deleted as they correspond to old entries that are no longer needed. According to other embodiments, show files with m−1 or less (i.e., m−1, m−2, m−3, etc.) could be instead deleted.

At this stage, the system can repeat from the point at which end users access the information about currently-playing shows, at various intervals and times. This would again result in doing reads on the database (cached data). The show file sub-states would still remain at e-passive since it is only the cached data that is read from, and there would be no new show files that would need to be filled. The activation count would remain at "m'" on each of the show files on which reads or requests are issued. At this stage, the steps performed previously may be performed repeatedly or continuously, by the same user 714 (e.g., a patron), or a different user, according to various embodiments.

In contrast to the example outlined above, other examples include caching an entire file directory tree itself in contrast to caching individual files or entries, as outlined above. The operation would proceed in a similar fashion to that outlined above, but would include caching the entire file directory tree each time a modification was made, according to various embodiments. In general, this could cover a directory listing for any type of use, including: telephone directories, a directory listing corresponding to photos or images, and a directory listing corresponding to publicly available patents and patent application publications, among many others.

FIG. 8 is a computer system 800 according to embodiments of the present disclosure.

Computer system 800, as shown, is configured with an interface 816 to enable controller 810 to receive a request to manage a cache, as described in particular with regard to FIGS. 4-6. An input 818 may be received at interface 816. In embodiments, the interface 816 can enable controller 810 to receive, or otherwise access, the input 818 via, for example, a network (e.g., an intranet, or a public network such as the Internet), or a storage medium, such as a disk drive internal or connected to controller 810. The interface can be configured for human input or other input devices, such as described later in regard to components of controller 810. It would be apparent to one of ordinary skill in the art that the interface can be any of a variety of interface types or mechanisms suitable for a computer, or a program operating in a computer, to receive or otherwise access or receive a source input or file.

Processors 812, 814 are included in controller 810 and are connected by a memory interface 820 to memory device or module 830. In embodiments, the memory 830 can be a cache memory, a main memory, a flash memory, or a combination of these or other varieties of electronic devices capable of storing information and, optionally, making the information, or locations storing the information within the memory 830, accessible to a processor. Memory 830 can be formed of a single electronic (or, in some embodiments, other technologies such as optical) module or can be formed of a plurality of memory devices. Memory 830, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 800 can include a plurality of memory devices. A memory interface, such as 820, between a one or more processors and one or more memory devices can be, for example, a memory bus common to one or more processors and one or more memory devices. In some embodiments, a memory interface, such as 820, between a processor (e.g., 812, 814) and a memory 830 can be point to point connection between the processor and the memory, and each processor in the computer 800 can have a point-to-point connection to each of one or more of the memory devices. In other embodiments, a processor (for example, 812) can be connected to a memory (e.g., memory 830) by means of a connection (not shown) to another processor (e.g., 814) connected to the memory (e.g., 820 from processor 814 to memory 830).

Computer 800 can include an input/output (I/O) bridge 850, which can be connected to a memory interface 820, or to processors 812, 814. An I/O bridge 850 can interface the processors 812, 814 and/or memory devices 830 of the computer 800 (or, other I/O devices) to I/O devices 860 connected to the bridge 820. For example, controller 810 includes I/O bridge 850 interfacing memory interface 820 to I/O devices, such as I/O device 860. In some embodiments, an I/O bridge can connect directly to a processor or a memory, or can be a component included in a processor or a memory. An I/O bridge 850 can be, for example, a peripheral component interconnect express (PCI-Express) or other I/O bus bridge, or can be an I/O adapter.

An I/O bridge 850 can connect to I/O devices 860 by means of an I/O interface, or I/O bus, such as I/O bus 822 of controller 810. For example, I/O bus 822 can be a PCI-Express or other I/O bus. I/O devices 860 can be any of a variety of peripheral I/O devices or I/O adapters connecting to peripheral I/O devices. For example, I/O device 860 can be a graphics card, keyboard or other input device, a hard disk drive (HDD), solid-state drive (SSD) or other storage device, a network interface card (NIC), etc. I/O devices 860 can include an I/O adapter, such as a PCI-Express adapter, that connects components (e.g., processors or memory devices) of the computer 800 to various I/O devices 860 (e.g., disk drives, Ethernet networks, video displays, keyboards, mice, styli, touchscreens, etc.).

Computer 800 can include instructions executable by one or more of the processors 812, 814 (or, processing elements, such as threads of a processor). The instructions can be a component of one or more programs. The programs, or the instructions, can be stored in, and/or utilize, one or more memory devices of computer 800. As illustrated in the example of FIG. 8, controller 810 includes a plurality of programs or modules, such as backing store module 806 and cache module 807. A program can be, for example, an application program, an operating system (OS) or a function of an OS, or a utility or built-in function of the computer 800. A program can be a hypervisor, and the hypervisor can, for example, manage sharing resources of the computer 800 (e.g., a processor or regions of a memory, or access to an I/O device) among a plurality of programs or OSes.

Programs can be "stand-alone" programs that execute on processors and use memory within the computer 800 directly, without requiring another program to control their execution or their use of resources of the computer 800. For example, controller 810 includes (optionally) stand-alone programs in backing store module 806 and cache module 807. A stand-alone program can perform particular functions within the computer 800, such as controlling, or interfacing (e.g., access by other programs) an I/O interface or I/O device. A stand-alone program can, for example, manage the operation, or access to, a memory (e.g., memory 830). A basic I/O subsystem (BIOS), or a computer boot program (e.g., a program that can load and initiate execution of other programs) can be a standalone program.

Controller 810 within computer 800 can include one or more OS 802, and an OS 802 can control the execution of other programs such as, for example, to start or stop a program, or to manage resources of the computer 800 used by a program. For example, controller 810 includes OS 802, which can include, or manage execution of, one or more programs, such as OS 802 including (or, managing) program 804. In some embodiments, an OS 802 can function as a hypervisor.

A program can be embodied as firmware (e.g., BIOS in a desktop computer, or a hypervisor) and the firmware can execute on one or more processors and, optionally, can use memory, included in the computer 800. Firmware can be stored in a memory (e.g., a flash memory) of the computer 800. For example, controller 810 includes firmware 840 stored in memory 830. In other embodiments, firmware can be embodied as instructions (e.g., comprising a computer program product) on a storage medium (e.g., a CD-ROM, DVD-ROM, a flash memory, or a disk drive), and the computer 800 can access the instructions from the storage medium.

In embodiments of the present disclosure, computer 800 can include instructions for VD/cache management and invalidation using activation counts. Controller 810 includes, for example, cache module 807 and backing store module 806, which can operate to control data transmission between one or more caches and one or more backing stores, e.g., using WT or WB cache modes. The computer 800 can store active cache counts at module 804 and/or the cache states at module 808 in a memory 830 of the computer 800, such as controller 810 storing the activation counts and cache states at cache module 807 and perform cache clean-up and/or cache transmission control in memory 830.

The example computer system 800 and controller 810 are not intended to limiting to embodiments. In embodiments, computer system 800 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of ordinary skill in the art to include a variety of computing devices interconnected in a variety of manners in a computer system embodying aspects and features of the disclosure.

In embodiments, controller 810 can be, for example, a computing device having a processor (e.g., 812) capable of executing computing instructions and, optionally, a memory 830 in communication with the processor. For example, controller 810 can be a desktop or laptop computer; a tablet computer, mobile computing device, personal digital assistant (PDA), or cellular phone; or, a server computer, a high-performance computer (HPC), or a super computer. Controller 810 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

According to various embodiments, a user may be a human user, such as an administrator or other technician. The user may take other forms, such as a computer program, application, or various embodiments of artificial intelligence, as used herein.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at cache management using activation counts and sub-state, that includes features of different illustrated embodiments. It is further understood that certain embodiments discussed above include using the activation counts of cache blocks to improve cache performance and clean-up.

The present invention has now been described with reference to several embodiments thereof. The entire disclosure of any patent or patent application identified herein is hereby incorporated by reference. The detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method comprising:
   accessing a cache including a plurality of cache blocks including at least a first cache block in an enabled state;
   setting the first cache block to an enabled-passive sub-state, the first cache block in the enabled-passive sub-state configured to be accessed or modified;
   receiving at least one access or modification request of the first cache block;
   transitioning the first cache block from the enabled-passive sub-state to an enabled-active sub-state; and
   incrementing a first cache activation count corresponding to the first cache block at an active cache counter in response to the transitioning the first cache block, the active cache counter configured to track cache activation counts including at least the first cache activation count to provide a coarse granularity of history of activation instances such that one or more cache blocks of the plurality of cache blocks including one or more cache blocks having a highest cache activation count are designated to be overwritten in the cache in a least-recently used first fashion based on the cache activation counts of the one or more cache blocks of the plurality of cache blocks.

2. The method of claim 1, wherein the first cache block is located on a virtual disk.

3. The method of claim 1, wherein modification of the first cache block includes: writing, changing, or deleting contents of the first cache block.

4. The method of claim 1, wherein the enabled-active sub-state includes all presently valid cache blocks upon receiving a read or write request.

5. The method of claim 1, further comprising:
   accessing the cache including the plurality of cache blocks including at least a second cache block in an enabled state;
   setting the second cache block to an enabled-passive sub-state, the second cache block in the enabled-passive sub-state configured to be accessed or modified;
   receiving at least one access or modification request of the second cache block;
   transitioning the second cache block from the enabled-passive sub-state to an enabled-active sub-state; and
   incrementing a second cache activation count corresponding to the second cache block at the active cache counter in response to the transitioning the second cache block.

6. The method of claim 5, wherein the first cache block is the same as the second cache block.

7. The method of claim 1, further comprising:
   overwriting the first cache block with a new entry in response to the incrementing the first cache activation count.

8. The method of claim 1, wherein the transitioning the first cache block from the enabled-passive sub-state to the enabled-active sub-state is in response to the receiving the at least one access or modification request of the first cache block.

9. The method of claim 5, wherein one of the cache activation counts is selected that corresponds to a cache block of the plurality of cache blocks, and wherein the first and second cache blocks are designated to be overwritten in the cache in a least-recently used first fashion up to the first and second cache blocks having the selected cache activation count.

10. A cache controller comprising:
a processor operatively connected to a memory and the controller configured to perform steps including:
accessing a cache including a plurality of cache blocks including at least a first cache block in an enabled state;
setting the first cache block to an enabled-passive sub-state, the first cache block in the enabled-passive sub-state configured to be accessed;
receiving at least one access request of the first cache block;
transitioning the first cache block from the enabled-passive sub-state to an enabled-active sub-state; and
incrementing a first cache activation count corresponding to the first cache block at an active cache counter in response to the transitioning the first cache block, the active cache counter configured to track cache activation counts including at least the first cache activation count to provide a coarse granularity of history of activation instances such that one or more cache blocks of the plurality of cache blocks including one or more cache blocks having a highest cache activation count are designated to be overwritten in the cache a least-recently used first fashion based on the cache activation counts of the one or more cache blocks of the plurality of cache blocks.

11. The cache controller of claim 10, wherein access of the first cache block includes: writing, changing, or deleting the first cache block's contents.

12. The cache controller of claim 10, wherein an enabled-active sub-state includes all presently valid cache blocks upon receiving a read or write request.

13. The cache controller of claim 10, wherein the controller is further configured to perform steps, including:
accessing the cache including the plurality of cache blocks including at least a second cache block in an enabled state;
setting the second cache block to an enabled-passive sub-state, the second cache block in the enabled-passive sub-state configured to be accessed;
receiving at least one access request of the second cache block;
transitioning the second cache block from the enabled-passive sub-state to an enabled-active sub-state; and
incrementing a second active cache count corresponding to the second cache block at the active cache counter in response to the transitioning the second cache block.

14. The cache controller of claim 10, wherein the controller is further configured to perform steps, including:
overwriting the first cache block with a new entry in response to incrementing the second active cache count.

15. The cache controller of claim 10, wherein the transitioning the first cache block from the enabled-passive sub-state to the enabled-active sub-state is in response to the receiving the at least one access request of the first cache block.

16. The cache controller of claim 10, wherein the cache blocks are designated to be overwritten in the cache in a least-recently used first fashion up to the cache blocks having a selected cache activation count.

17. A computer program product for cache management comprising: a computer-readable storage device having a computer-readable program stored therein, wherein the computer-readable program, when executed on a computing device, causes the computing device to:
access a cache including a plurality of cache blocks including at least a first cache block in an enabled state;
set the first cache block to an enabled-passive sub-state, the first cache block in the enabled-passive sub-state configured to be accessed or modified;
receive at least one access or modification request of the first cache block;
transition the first cache block from the enabled-passive sub-state to an enabled-active sub-state; and
increment a first cache activation count corresponding to the first cache block at an active cache counter in response to the transitioning the first cache block, the active cache counter configured to track activation counts including at least the first cache activation count to provide a coarse granularity of history of activation instances such that one or more cache blocks of the plurality of cache blocks including one or more cache blocks having a highest cache activation count are designated to be overwritten in the cache in a least-recently used first fashion based on the cache activation counts of the one or more cache blocks of the plurality of cache blocks.

18. The computer program product of claim 17, wherein modification of the first cache block includes: writing, changing, or deleting the first cache block's contents.

19. The computer program product of claim 17, wherein the computer-readable program, when executed on the computing device, further causes the computing device to:
access the cache including the plurality of cache blocks including at least a second cache block in an enabled state;
set the second cache block to an enabled-passive sub-state, wherein the second cache block in the enabled-passive sub-state is configured to be accessed or modified;
receive at least one access or modification request of the second cache block;
transition the second cache block from the enabled-passive sub-state to an enabled-active sub-state; and
increment a second activation count corresponding to the second cache block at the active cache counter in response to the transitioning.

20. The computer program product of claim 17, wherein the transitioning the first cache block from the enabled-passive sub-state to the enabled-active sub-state is in response to the receiving the at least one access or modification request of the first cache block.

* * * * *